US012614845B2

(12) United States Patent
Alonso Fernandez et al.

(10) Patent No.: US 12,614,845 B2
(45) Date of Patent: Apr. 28, 2026

(54) SYSTEM FOR CONTROLLING A PHASE ARRAY ANTENNA

(71) Applicant: CELESTIA TECHNOLOGIES GROUP UK, LTD., Thame (GB)

(72) Inventors: José Esmeraldo Alonso Fernandez, Thame (GB); Alberto Pellón Sancho, Thame (GB)

(73) Assignee: CELESTIA TECHNOLOGIES GROUP UK, LTD., Thame (GB)

( * ) Notice: Subject to any disclaimer, the term of this patent is extended or adjusted under 35 U.S.C. 154(b) by 249 days.

(21) Appl. No.: 18/703,470

(22) PCT Filed: Oct. 17, 2022

(86) PCT No.: PCT/EP2022/078777
§ 371 (c)(1),
(2) Date: Apr. 22, 2024

(87) PCT Pub. No.: WO2023/066839
PCT Pub. Date: Apr. 27, 2023

(65) Prior Publication Data

US 2026/0058363 A1 Feb. 26, 2026

(30) Foreign Application Priority Data

Oct. 21, 2021 (EP) .................................... 21203888

(51) Int. Cl.
*H01Q 3/36* (2006.01)

(52) U.S. Cl.
CPC .................................... *H01Q 3/36* (2013.01)

(58) Field of Classification Search
CPC ........................................................ H01Q 3/36
USPC ........................................................ 342/375
See application file for complete search history.

(56) References Cited

U.S. PATENT DOCUMENTS

2007/0194986 A1 8/2007 Dulmovits, Jr. et al.
2018/0131102 A1 * 5/2018 Wang ...................... H01Q 3/38
2020/0388917 A1 12/2020 Fujibayashi

OTHER PUBLICATIONS

Mariem Kanoun, et al., "A Fully Integrated 5.8 GHz BiCMOS SiGe:C tunable active phase shifter for Beamforming", 2018 30th International Conference on Microelectronics (ICM), pp. 220-223, 2018.

(Continued)

*Primary Examiner* — Harry K Liu
(74) *Attorney, Agent, or Firm* — LUCAS & MERCANTI, LLP

(57) ABSTRACT

A system for controlling a phase array antenna comprising a plurality of compensation units (2) associated to corresponding radiating elements (30) of the phase array antenna. The compensating unit (2) comprises a phase slope control module (10) that controls the phase slope of a radio frequency (RF) signal and comprises a no-delay line with a first variable gain amplifier (11) and a delay line with a second variable gain amplifier (12) and a delay line element (13), wherein the gain of the first amplifier and the gain of the second amplifier are interrelated. The compensating unit (2) comprises a phase shifter (20) that controls the phase shifting of the RF signal, wherein the phase shifter (20) and the phase slope control module (10) are connected. A processing unit (3) can coordinate the compensation units (2).

13 Claims, 13 Drawing Sheets

(56) References Cited

OTHER PUBLICATIONS

Seyed Kasra Garakoui, et al., "Phased-Array Antenna Beam Squinting Related to Frequency Dependency of Delay Circuits", Proceedings of the 41st European Microwave Conference (EUMC), pp. 1304-1307, 2011.

International Search Report and Written Opinion for Corresponding International Application No. PCT/EP2022/078777, Jan. 20, 2023, 10 pages.

* cited by examiner

SYSTEM FOR CONTROLLING A PHASE ARRAY ANTENNA

CROSS-REFERENCE TO RELATED APPLICATIONS

This application is a 371 of PCT/EP2022/078777, filed Oct. 17, 2022, which claims the benefit of European Patent Application No. 21203888.9, filed Oct. 21, 2021, each of which are incorporated herein by reference

FIELD

The present disclosure generally teaches techniques related to radio frequency antennas with radiating elements, and more particularly to phase array antennas with beam squint control.

BACKGROUND

An array antenna is a set of multiple connected antennas which work together as a single antenna, to transmit or receive radio waves.

In phase array antennas, each individual radiating element is electrically connected to the transmitter or receiver through a phase shifter controlled by a computer. Phase array antennas can be steered electronically to point in any direction over a wide angle, without moving the radiating elements.

Beam squint is an important phenomenon that can limit the BW in active/passive phase array antennas. It produces an undesired change in the beam direction that depends on the frequency.

The effect of beam squint is very significant in phase array antennas where a passive power feeding network is in serial mode. In a waveguide slotted antenna, the physical distance between slots defines the pointing direction of the array. This physical distance is equivalent to an electrical distance when two different frequency points are considered.

For active phase array antennas in which only phase shifting is applied, beam squint depends on the frequency point of the bandwidth (BW). The reason is the physical distance (on air) for each pointing angle implies a different electrical distance depending on the frequency considered.

Consequently, when the development of phase array antennas, time delay compensation is key. The delay compensation is especially important when the BW of the antenna is wide, and the beamwidth of the antenna is narrow.

Usually, the architecture of phase array antennas is based on a group of serial switches selecting between different line lengths. However, such phase array antennas have several drawbacks in terms of size and cost.

Prior-art FIG. 1 represents the natural delay in a phase array antenna due to beam tilting. For a certain value of x, physical distance is transformed to electrical distance based on the formula:

$$\text{Electrical delay } (deg) = \frac{x}{c} * f_0 * 360$$

In case of a wideband signal, there are usually three important frequency values to consider: $f_1$=Beginning of the BW, $f_0$=Center of the BW, and $f_2$=End of the BW.

In order to correct deviation in the direction of the beam created by the radiating elements, a different electrical delay is needed to compensate for each frequency value. Since the phase shifters can only create a single value of phase shifting, usually the value selected is the one suitable for the center of the BW. The edges (endpoints) of the BW will be compensating a higher or lower value than the theoretical one, and this results in another pointing direction or beam squint as can be seen in prior-art FIG. 2.

In prior-art FIG. 2 a diagram illustrates a radiating pattern of a phase array antenna properly pointing at the central frequency in solid line and the expected response with a beam squint effect in a frequency edge in dashed line. The beam squint is dependent on the frequency difference between $f_0$ and $f_1$, $f_2$. Therefore, the effect is significant in broadband antennas. For instance, in radar antennas using a single carrier, beam squint is not normally an issue.

The effect for broadband antennas having a large number of radiating elements is even more important. Antennas with few radiating elements have wide beam-widths and a beam squint may be undetected. However, in large arrays with a very narrow beamwidth, a beam squint implies a weak gain in the desired direction.

Prior-art FIG. 3 shows a phase and amplitude control in narrowband phase array antennas and/or small phase array antennas. Adjusting the phase of each radiating element can be done in RF (Radio Frequency), IF (Intermediate Frequency) or LO (Local Oscillator) domain. However, the phase adjusting technique only provides the exact right phase at a single frequency, being therefore optimum for narrowband applications. If an application requires a wideband, different techniques are required to avoid the effect of beam squint.

Other existing techniques apply phase shifting at subarray level and true time delay at antenna level in order to avoid the beam squint effect. However, high sidelobes may be produced, which can be out of the regulatory requirements.

Prior-art FIG. 4 shows a true time delay and amplitude control for a wideband phase array antenna. The technique of true time delay uses switches and different line lengths. The technique has several drawbacks. It usually involves bulky structures. It requires an additional amplifier because it has high losses. In high frequency (HF) phase array antennas, the integration is a key aspect. Allocation of components is complex specially if multiple switches are needed to get a high accuracy. Similarly, recovering losses implies amplifiers are required. These amplifiers need to be variable gain amplifiers (VGAs) since different switch positions may have different losses. Moreover, components work at a high switching rate due to the fast phase adjustment needed. In this scenario, the switching time become critical since during switching the communication is interrupted (usually in the order of micro-seconds). A low switching rate can be normally handled. However, when a high rate is mandatory, it becomes a problem.

Finally, certain techniques use polygonal algorithms to reduce sidelobes. A good example of it can be found in the document: "Unequal Polyomino Layers for Reduced SLL Arrays with Scanning Ability" Piero Angeletti, Giuseppe Pelosi, Stefano Selleri, Ruggero Taddei and Giovanni Toso. *Progress In Electromagnetics Research, Vol.* 162, 31-38, 2018. The level of improvement achievable with this technique is quite low. Additionally, it is complex and not applicable for some scenarios.

Therefore, there is a current need in the state of the art to enable proper time delay control for phase array antennas and to prevent unfocusing of the antenna across frequency values.

SUMMARY

The present invention was made in view of the shortcomings of the state of the art and aims at a system for controlling a phase array antenna as defined in claim 1. Advantageous embodiments of the system are set forth in dependent claims. The system addresses the demanding need for accurate delay control in phase array antennas avoiding, or at least reducing, beam squint or high sidelobes as well as obtaining high level of integration. In particular, when the range of frequencies (BW) used by the phase array antenna for effective communication is wide.

The system has several advantages such as: a more compact implementation, a lower cost, an improved gain and versatility.

In particular, the system avoids using a high number of switches that may introduce complexity, losses and a big area in the die (which is costly) or in a printed circuit board, PCB (which is a barrier to integrability).

The system is able to steer electronically and to point in any direction over a wide angle and to control the phase slope of the radio frequency (RF) signals for each radiating element of the phase array antenna so that beam squint is minimized or avoided. An embodiment of the system can also be used as a variable gain amplifier (VGA).

The system includes several compensation units, each one associated with a corresponding radiating element of a phase array antenna. A compensation unit includes a phase slope control module for controlling the phase slope of a RF signal of a radiating element of the phase array antenna. The phase slope control module includes a no-delay line with a first variable gain amplifier and a fixed delay line with a second variable gain amplifier. The gains of amplifiers are interrelated (they may be controlled in differential mode). The compensation unit also includes a phase shifter for controlling the phase shifting of the RF signal. The phase shifter and the phase slope control module are electrically connected. The phase shifter may include in certain embodiments a vector modulator and a gilbert cell. The phase shifter can be standard in some embodiments.

Both, the phase shifter and the phase slope control module cooperate to avoid or at least reduce beam squint. A processing unit may monitor and manage the compensation units. The processing unit can coordinate how each compensation unit is working.

There are several types of phase shifters. A first type achieves a high performance but in exchange of larger size and/or cost. A second type of phase shifters is inexpensive, has a low performance a reduced size. Advantageously, the proposed phase slope control module makes it possible to utilize second type of phase shifters without impacting performance. Some phase shifters create an undesired phase slope depending on the phase shifting applied. The present invention deals with this issue as the undesired phase slope can be removed with the phase slope control module for each radiating element. As a result, an optimum beam steering is obtained.

REFERENCE NUMBERS

Figure 1:
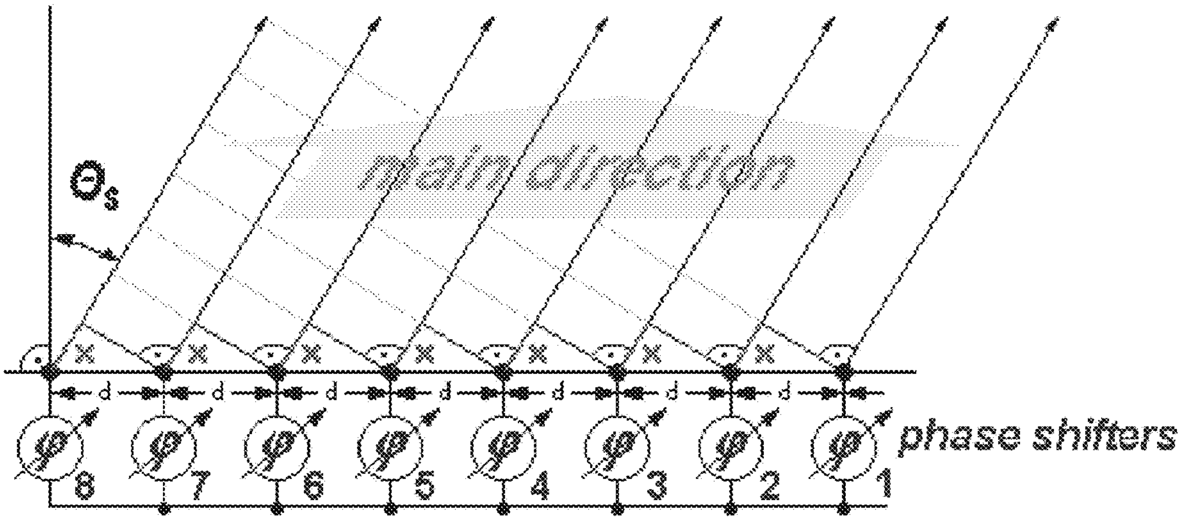
Fig. 1 (Prior art)
FIG. 1 illustrates a natural delay in a prior-art array antenna due to beam tilting.
Figure 2:
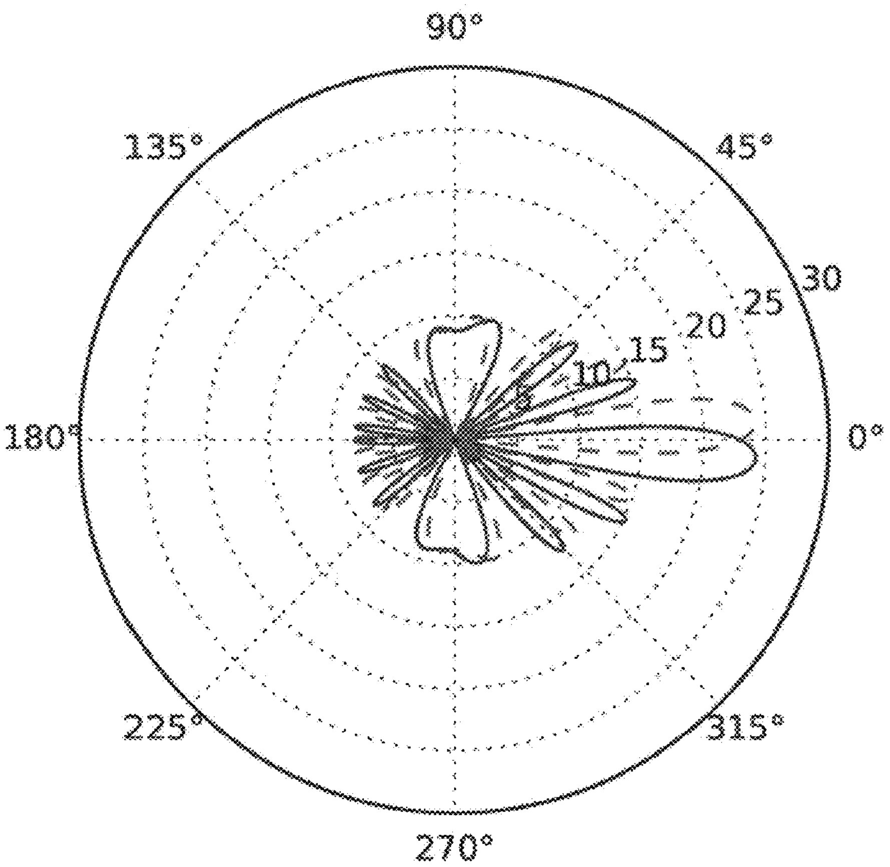
Fig. 2 (Prior art)
FIG. 2 illustrates a typical beam squint effect in a prior-art phase array antenna.
Figure 3:
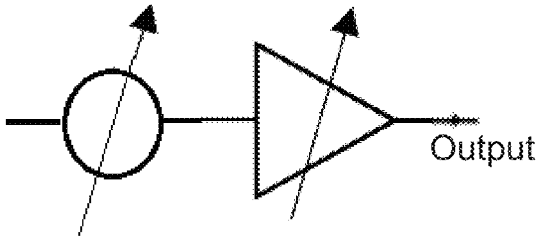
Fig. 3 (Prior art)
FIG. 3 illustrates a typical phase and amplitude control in prior-art narrowband phase array antennas.
Figure 4:
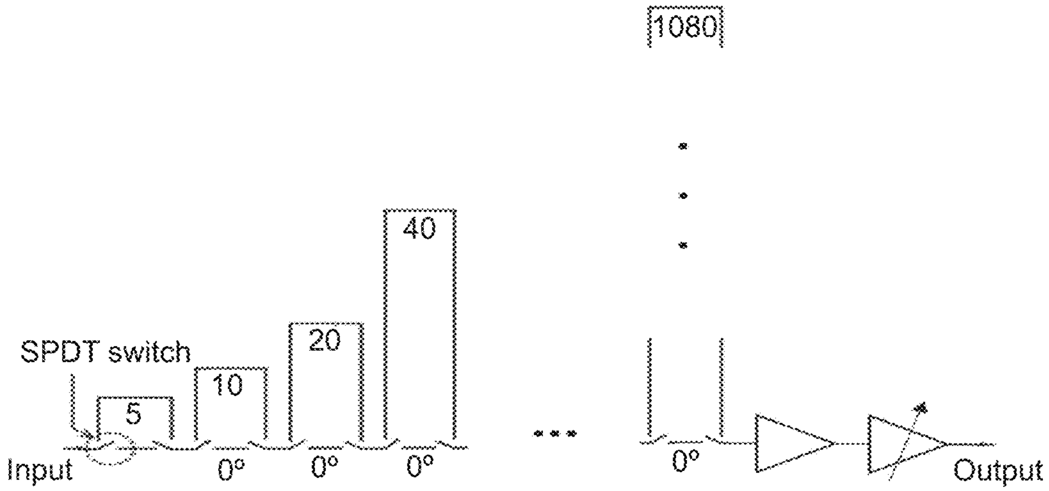
Fig. 4 (Prior art)
FIG. 4 illustrates a typical delay and amplitude control in prior-art wideband phase array antennas.

1: System for controlling a phase array antenna
2: Compensation unit
3: Processing unit
4: Input port
5: Splitter
6: Combiner
7: Output port
10: Phase slope compensation module.
11, 12: Variable gain amplifier (VGA).
13: Delay line element (dl)
20: Phase shifter
30: Radiating element

DETAILED DESCRIPTION

Several aspects and embodiments of the system according to the present invention will be explained with reference to the remainder drawings for a better understanding.

Figure 5A:
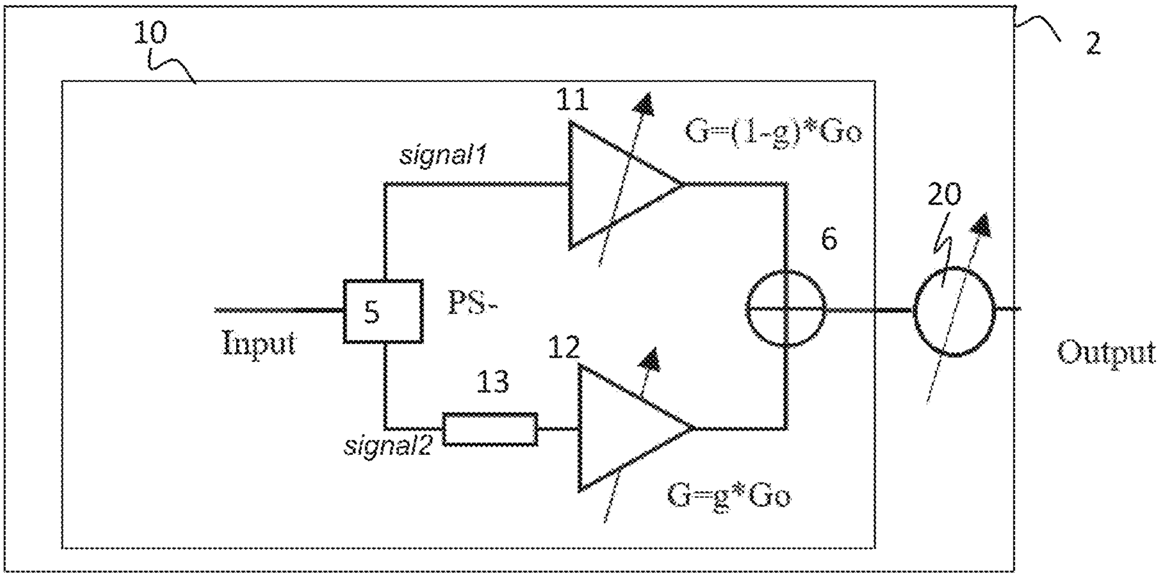
FIG. 5A illustrates a high-level block diagram of a compensation unit of the system according to the invention.

FIG. 5A is a simplified high-level block diagram showing an embodiment of a compensation unit 2 as part of the system. The compensation unit 2 has two independent modules. The first one is a phase slope control module 10 able to control the phase slope of the radio frequency (RF) signal while the second one is a phase shifter 20 able to control the phase shifting. The compensation unit 2 performs a fine delay control to correct deviation in the direction of the beam produced by each radiating element and thus the phase array antenna can avoid beam squint.

In the phase slope control module 10, an input RF signal is split by a splitter 5 in two RF signals: signal1 and signal2 using different circuit lines. In one of these two signals (signal2) a fixed delay is set by means of a fixed delay line element 13, so it is lagged compared to the other signal (signal1). Both, the delayed signal and non-delayed signal serve as inputs with a different synchronicity to a corresponding variable gain amplifier 11, 12 (VGAs). Finally, the outputs of the two VGAs 11, 12 are combined. This approach provides a fine tune of the phase slope. The delay compensation is important to avoid beam squint as well as quantization lobes at the edges of the BW with high scan angles for such a large BW. By the delay line element 13, the path length of the second line circuit is like it is longer compared to the first one. The path length difference is selected to be an integer number of wavelengths A to the center frequency of the BW. The position of the phase shifter 20 may be at the input, instead of at the output of the phase slope control module 10 as illustrated in FIG. 5A.

Figure 5B:
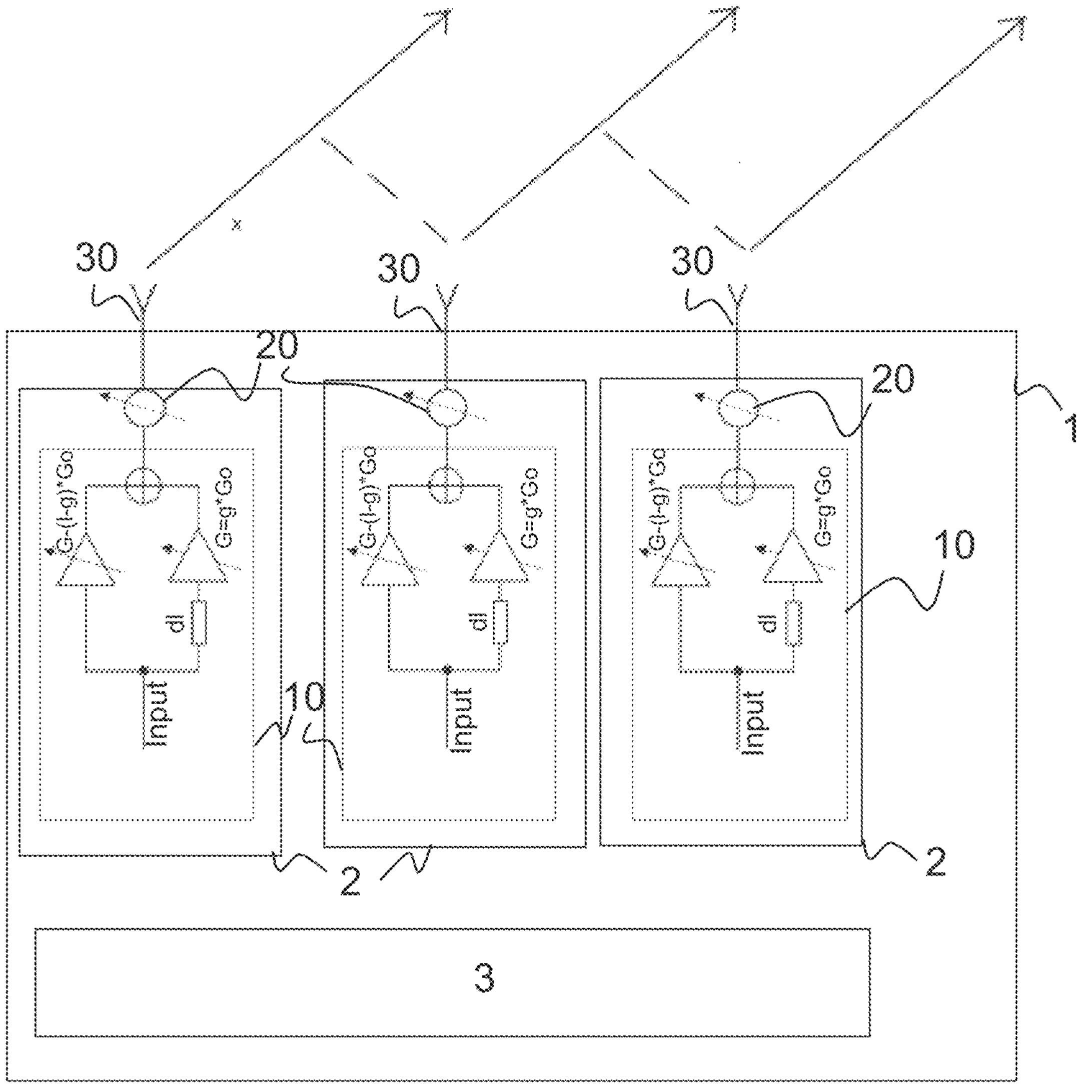
FIG. 5B illustrates a more detailed block diagram of the system according to the invention in a phase array antenna.

FIG. 5B shows a block diagram of the system 1 deployed in a phase array antenna with three compensation units 2 and three radiating elements 30. Each radiating element 30 has a phase slope control module 10 that individually handles the phase slope of the RF signal and a phase shifter 20 that individually handles the phase shifting of the RF signal. The system 1 coordinates the compensation units 2 associated to each radiating element 30. The system 1 performs phase shifting and phase slope control independently for the radiating elements 30. The system 1 performs independent amplitude control using the VGAs 11, 12. These operations per radiating element 30 make the system 1 ideal for broadband phase array antennas avoiding beam-squint issues.

The system may comprise a processing unit 3 coupled to the phase slope control module 10 and the phase shifter 20 programmed to set proper values for controlling phase slope and phase shift.

Figure 6:
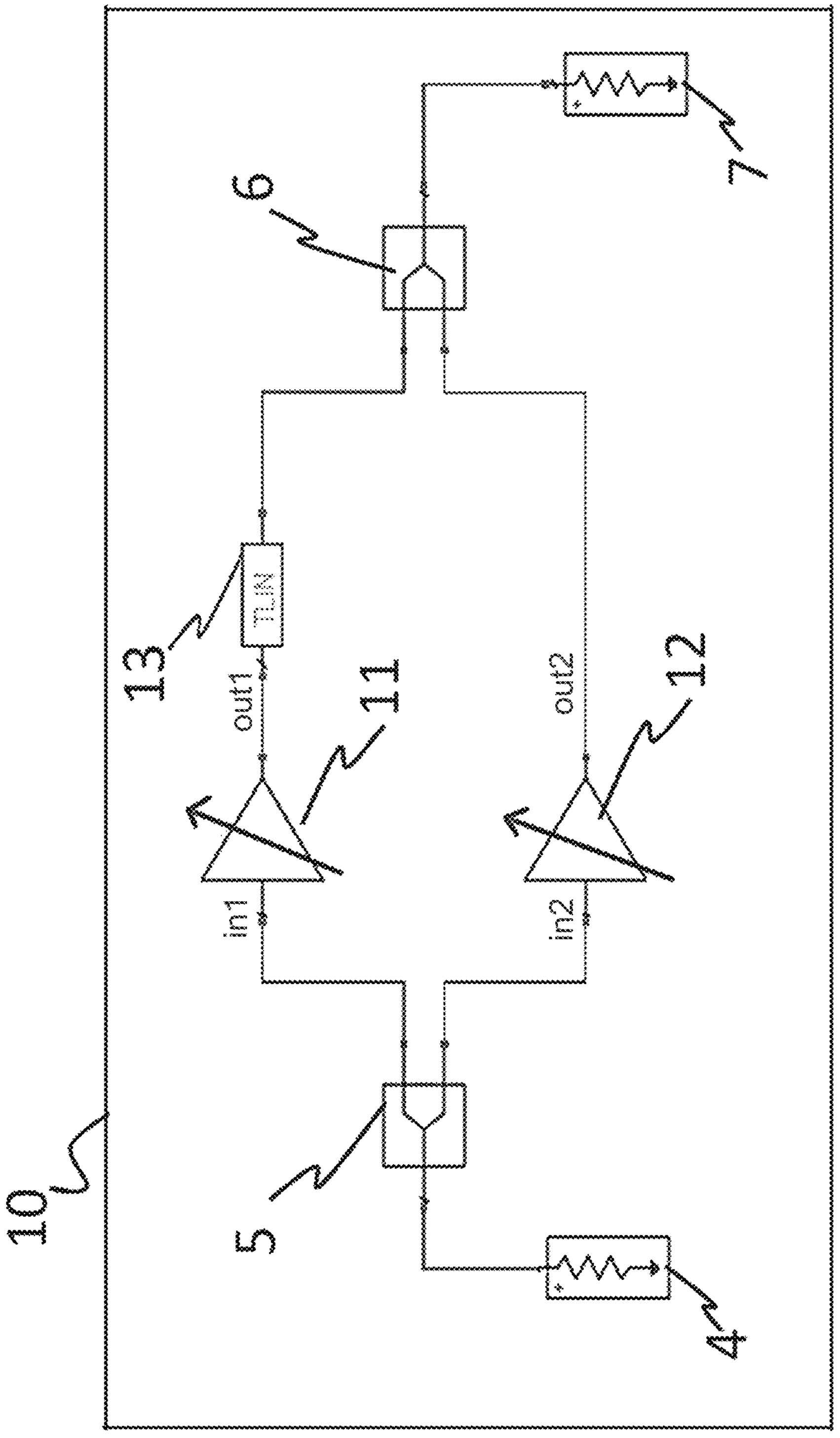
FIG. 6 illustrates a circuit diagram of an embodiment of a phase slope compensation module of the invention.

FIG. 6 is an example of circuit layout of the embodiment of the phase slope compensation module 10 of FIG. 5A. The particular values of the circuit of FIG. 6 are chosen for simulation purposes for a better appreciation of how the system works. Other different values can be validly applied.

List of Values and Parameters of Components Used:

Input port 4 and output port 7: 50 ohm or high impedance (both options feasible). The input and output ports can be selected 50 ohms since it is the standard value in most of RF devices (however this is not mandatory and other values can be used such as high impedance ports, for instance). The splitter 5 and combiner 6 are in −3 dB configuration although other alternatives are feasible.

The value for the delay line element 13 length is much more critical. The longer the line, the higher the phase slope that can be compensated. However, the length value needs to be limited due to the amplitude ripple produced when two signals with different delay are combined. This ripple does not appear in the center of the BW, however it will appear when reaching the edge of the BW due to the different phase of the two signals out of the center frequency of the band. For a signal of 2.5 GHz of BW, as can be Ka frequency band, a maximum of 3 times the wavelength is a sensible number due to the low amplitude ripple produced. This length value needs to be selected depending on the characteristics of the array as well as the frequency band and BW. However, it is important this value is an integer number of wavelengths at the center of the BW. Some embodiments may include the delay line element 13 as an integrated or a separated element of the system 1.

Another relevant parameter is related to the VGAs dynamic range. The higher the dynamic range, the closer the phase result will be to the edges of the delay, being the edges zero delay or N times the wavelength at center frequency defined in the delay line element, 13.

See table 1 below for different combination of gain values (from −40 dB to 11 dB) for VGAs 11, 12; Note Gain1 is gain for amplifier 11, Gain2 is gain for amplifier 12.

TABLE 1

| Phase (27.5 GHz) | Gain1 (dB) | Gain2 (dB) |
|---|---|---|
| 46.8 | 11 | −40 |
| 43.7 | 10.5 | −10.5 |
| 40.6 | 10 | −5.3 |
| 37.5 | 9.5 | −2.2 |
| 34.4 | 8.8 | 0.5 |
| 31.2 | 8.1 | 2.4 |
| 28.1 | 7.2 | 4 |
| 25 | 6.3 | 5.2 |
| 21.9 | 5.2 | 6.3 |
| 18.7 | 4 | 7.2 |
| 15.6 | 2.4 | 8.1 |
| 12.5 | 0.5 | 8.8 |
| 9.4 | −2.2 | 9.5 |
| 6.2 | −5.3 | 10 |
| 3.1 | −10.5 | 10.5 |
| 0.0 | −40 | 11 |

The splitter 5 of the phase slope compensation module 10 produces a division of the circuit in two branches or lines, each line produces a corresponding RF signal. The adjustment of the magnitude of the two signals via setting the gain of each VGA 11, 12 provides a fine phase slope compensation.

Despite the adjustment can be made independently, if a constant amplitude response is required for any phase slope created—as usual for a phase array antenna with constant amplitude in the radiating elements—a relationship between gains of amplifiers is needed. This relationship is exemplified in Table 1. Thus gains of the VGA 12, 13 are selected and controlled in an asymmetric way. There is differential mode relationship between them. The greater gain 1 is, the smaller gain 2 is.

Being Go the maximum gain achievable by an amplifier, one of the VGA can adjust its gain from 0 to Go on a parameter named g, with g as the variable parameter to modify the phase slope value.

$$\text{Gain1} = g * \text{Go}$$

When considering this the Gain2 value should be set as follows:

$$\text{Gain2} = (1 - g) * \text{Go}$$

Then the relationship can be formulated as follows:

$$\text{Gain2} = \text{Gain1} * (1 - g)/g$$

According to the proposed approach, size and complexity is almost independent on the accuracy. High accuracy only impacts on a potential digital-analog converter (DAC) controlling the system if desired a digital implementation, but the size of the DAC is negligible when compared to the RF parts. Conversely, accuracy in prior-art delay control circuits is defined by the number of switches and lines. Consequently, a prior-art circuit typically becomes bigger when a high accuracy is needed.

Equation used to compute equivalent phase slope control delay line length:

$$l_{DL}(\lambda_0) = \frac{c}{360} * \frac{\Delta\varphi_{DL}}{\Delta f} * \frac{1}{\lambda_0} = \frac{1}{360} * \frac{f_0}{\Delta f} * \Delta\varphi_{DL} \qquad c = \lambda_0 * f_0$$

In this equation lox means the length of the fixed delay line implemented, c is the speed of light, $f_0$ is the center frequency of the BW, being Δf the BW itself. Finally, $\Delta\varphi_{DL}$ is the phase difference that needs to be compensated in degrees. Thus, delay line element depends on phase difference and on a ratio of $f_0$ to BW.

For high frequency and wideband signals, a simulation at the whole Ka band (from 27.5 GHz to 30 GHZ) of this circuit is performed. Several simulation results are represented in FIGS. 7-10 for different delay values (3λ and 4λ).

The fixed delay value is several times the wavelength (λ). Selecting an integer number of A for the delay line balances the phase slope around the central frequency, $f_0$ of the BW.

An independent phase shifter 20 may later control the offset in phase. The number of different phase slopes achievable within the range is infinite if an analog control is applied. If a digital control is desired, the limitation is due to the need of a digital-analog converter (DAC). Thus, the circuit can be the same and no size change is required. The results are a function of the fixed delay value. For a proper fine tuning, a suitable number of integer λ at $f_0$ is preferably set. The proper selection of such an integer N depends on the array sizing, on a workable scan angle range and on the BW of the system.

Figure 7:
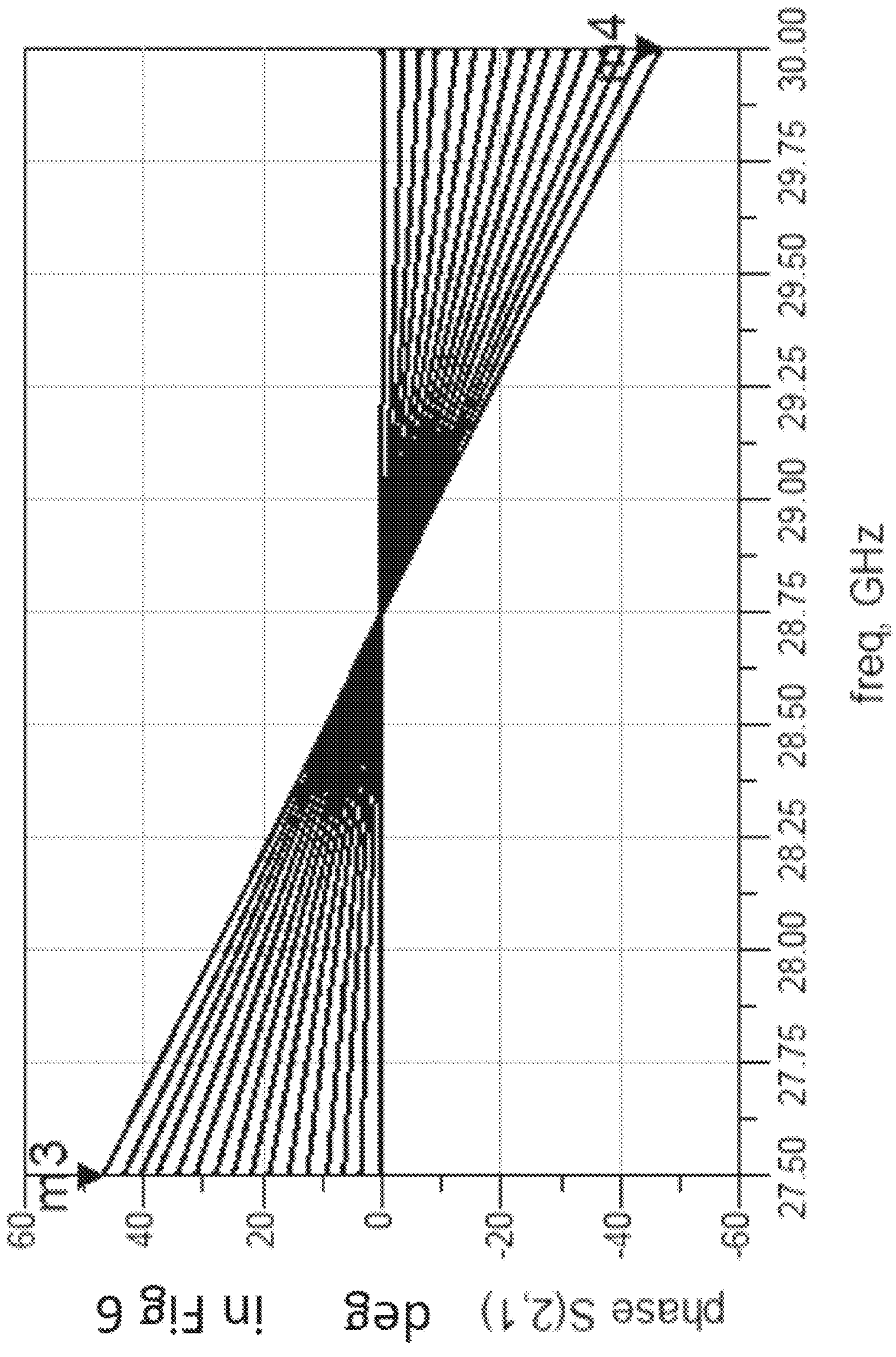
FIG. 7 illustrates a graph of simulation results of phase S(2,1) deg, where can be seen a phase slope compensation module with a fixed 3λ delay line according to the embodiment of FIG. 6.

FIG. 7 is a simulation representation of results of the phase response in deg using 3λ delay for gain values of the table 1. As can be seen, by controlling the gain of the two VGAs, the phase slope can be modified. In the figure we can see frequency in the X axis and phase (deg) in the Y axis. As can be seen in FIG. 6 there are two ports, an output port and an input port being the relationship in phase between them represented as the S(2,1) in phase. If the gain of the first VGA is set at maximum and the second VGA at minimum, all the signal power passes through the "zero delay" line represented as a flat phase slope for reference. If the gain of the second VGA is set at maximum and the first VGA is at minimum, all the signal power passes through the N A line. By balancing the gain of each VGA, any intermediate phase slope can be achieved. As depicted, m3 corresponds to a frequency of 27.5 GHZ and a phase of 46.839 deg. Likewise, m4 corresponds to a frequency of 30 GHz and a phase of −46.839 deg.

Figure 8:
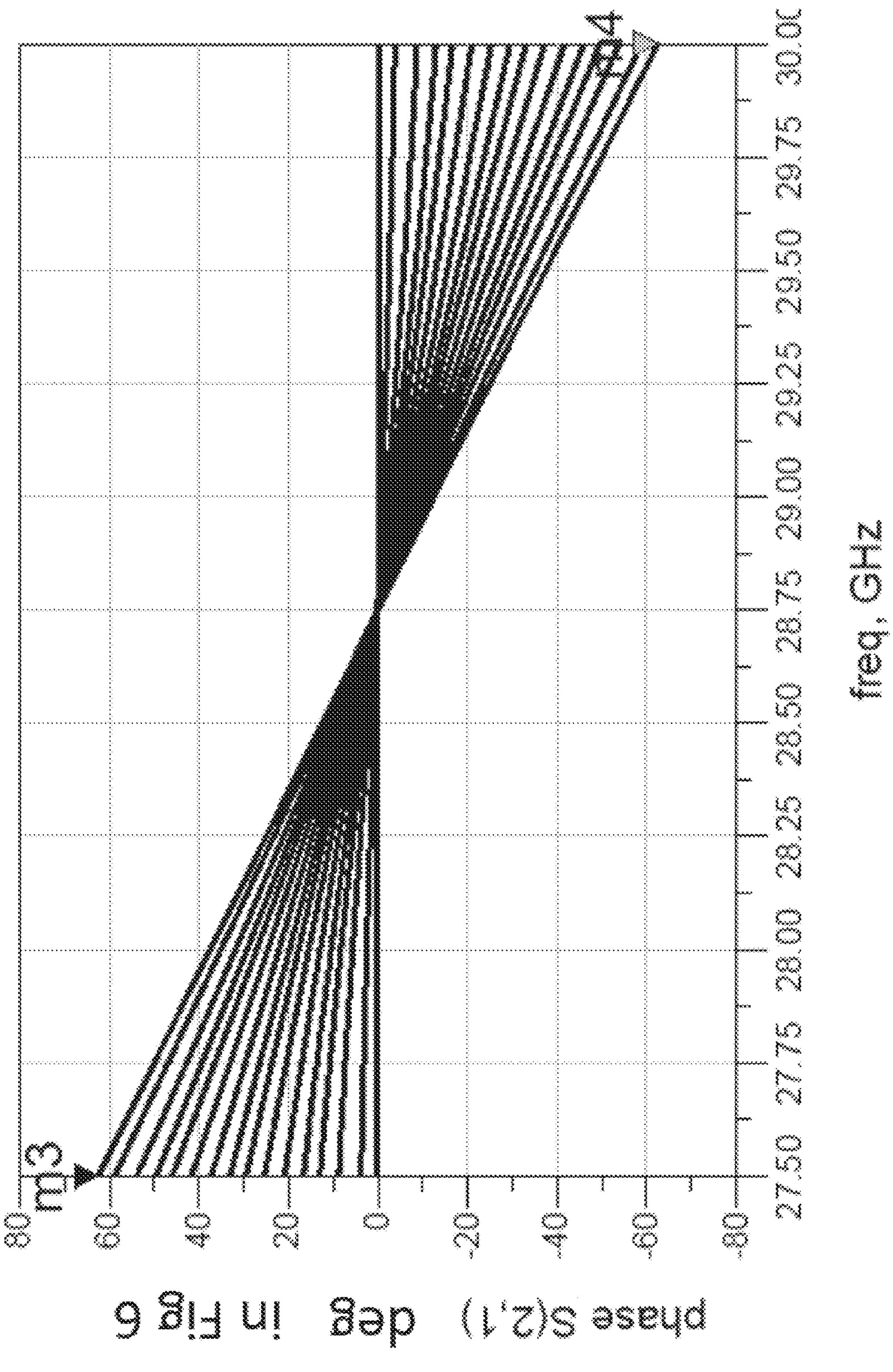
FIG. 8 illustrates a graph of simulation results of phase S(2,1) deg, where can be seen a phase slope compensation module with a fixed 4λ delay line according to the embodiment of FIG. 6.

FIG. 8 is another simulation representation using 4λ delay for the same gain values of the table 1. In the figure we can see frequency in the X axis and phase (deg) in the Y axis. As can be seen in FIG. 6 there are two ports, an output port and an input port being the relationship in phase between them represented as the S(2,1) in phase. As expected, the phase slope range is increased but the operation of the circuit remains the same. As depicted, m3 corresponds to a frequency of 27.5 GHZ and a phase of 62.466. Likewise, m4 corresponds to a frequency of 30 GHz and a phase of −62.466 deg.

As discussed, there is not a unique pair of gains in the VGAs to produce a desired phase slope. A desired phase slope can be achieved by means of different combinations of gains for the VGAs 11, 12. The appropriate selection of the gain values for the VGAs is important. Typically, the chosen pair is the one that keeps the gain value of the whole system stable. The selection criteria for gain values can be summarized as the one that provides a stable amplitude response independently of the phase slope desired, typically this range is selected below 0.5 dB, and the phase slope is as desired with an error less than 3 deg. These numbers are usual references in phase array developments but different criteria can be applied depending on the case.

To select a stable pair of individual gain values for the amplifiers in a compensation unit, it is suitable to use values that provide the same gain in the compensation unit, independently of the phase slope generated. In that regard, when both amplifiers have the same gain, half of the maximum delay (N/2λ) is achieved. Thus, the gain values for the amplifiers under this condition achieve the same overall gain in the compensation unit as when one amplifier is at maximum and the other one at minimum, being this the condition to get either minimum or maximum phase slope.

In order to give an example of the functionality during scanning of the phase array antenna, let us refer back to FIG. 5B when a maximum workable scan angle within a scan angle range in one direction is desired. In that case one (e.g. right) of the edge radiating elements 30 needs a zero delay while the radiating element at the opposite edge (e.g. left) of the array needs a maximum (N λ) delay. In this situation the VGAs of the phase slope compensation module 10 will be at the limit of the dynamic range.

In the first (right) radiating element 30 maximum gain will be provided to the no-delayed signal and minimum gain to the (N λ) delayed signal, while in the radiating element 30 (left) at the opposite edge of the array the values of the VGAs of that circuit will be the opposite. For the sake of clarity, the values provided in table 1 will be used, and therefore one VGA 11 will have 11 dB of gain while the other VGA 12 will have −40 dB of gain.

With this configuration each compensation unit 2 will provide a certain amplitude response (gain) having in both cases one of its VGA at maximum and the other VGA at minimum. When the scan angle changes and other delay line compensation is required, the values of the VGAs 11, 12 will need to be changed, however it is desirable that the overall amplitude response keeps constant and does not depend on the scan angle desired, and therefore the phase slope to compensate, in the phase array antenna.

When considering a scan angle equals to zero, usually named broadside, understanding broadside as the condition where a scan angle equal to zero is created, the values of delay for the two radiating elements 30 in the edges of the array are the same. However, there are several combinations of values for the VGAs 11, 12 that provide the same delay for both radiating elements. All compensation units 2 can have the VGAs 11 and 12 at maximum power, or at minimum, or to half of the power, or both compensation units 2 can have the VGAs at 3 dB of gain for instance. If both the radiating elements have the phase slope control module 10 in the same condition it is ensured that the delay keeps being the same for both as is needed in a no scan pointing angle. However, most of these combination values do not keep the same amplitude response as the maximum scan configuration. So, if a constant amplitude response of the phase array antenna is expected while scanning, it is important to select the VGAs 11, 12 values that match that criteria as well and not only the right phase slope desired.

This selection process must be done for any intermediate value to address how much gain one VGA needs to be increased and how much the other one be reduced for a certain phase slope desired. By doing so, the system maintains a constant total gain independently of the phase slope generated. The processing unit 3 may provide the selection of gain values.

Figure 9:
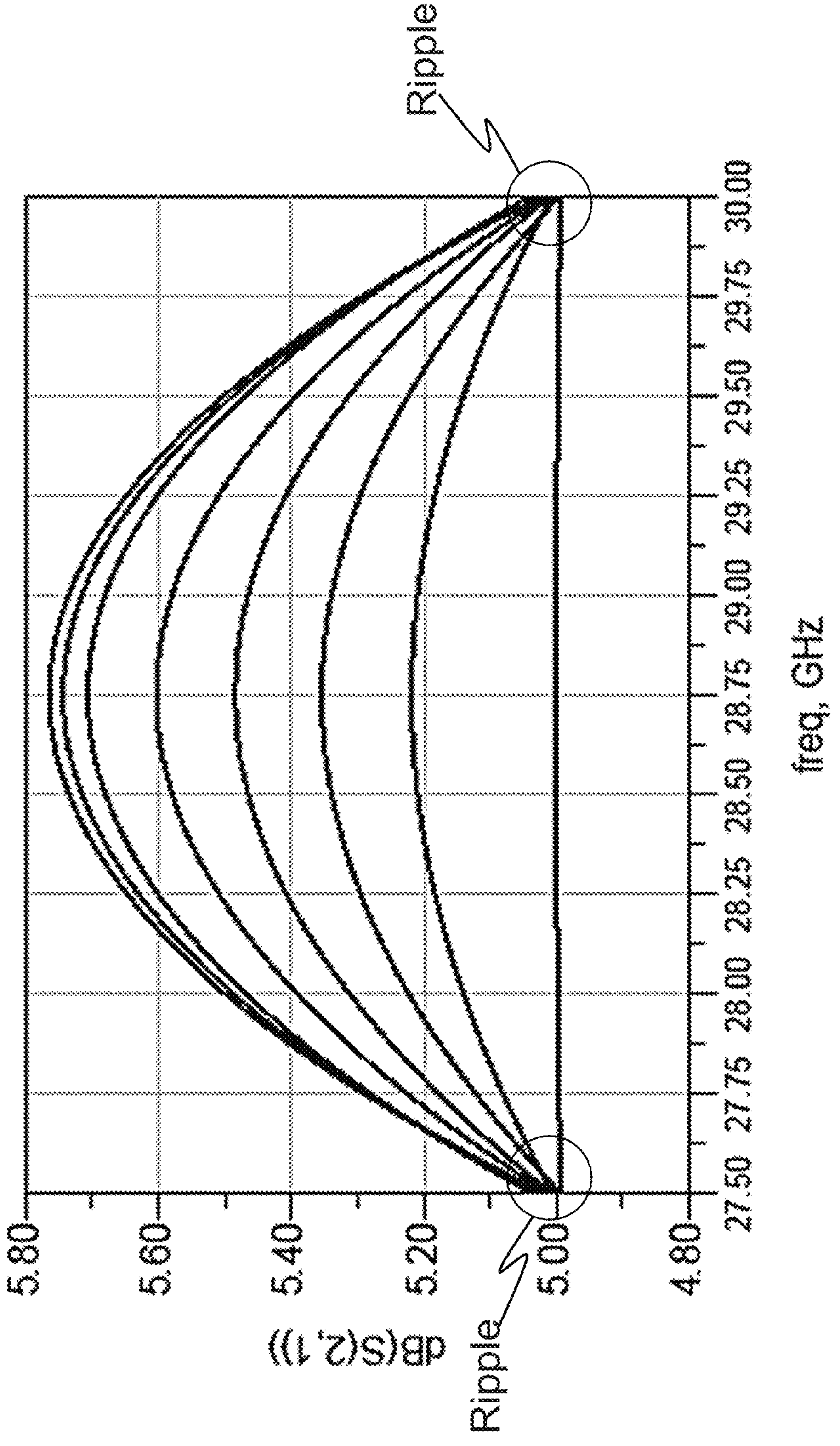
FIG. 9 illustrates a graph of amplitude response simulation results, S21(dB) of a phase slope compensation module with a fixed 4λ delay line according to the embodiment of FIG. 6.

FIG. 9 is a representation of the amplitude response of the table 1 versus frequency for 3) delay line. In the figure we can see frequency in the X axis and amplitude S21 (dB) in the Y axis. As can be seen in FIG. 6 there are two ports, an output port and an input port being the relationship in amplitude between them represented as the S(2,1) in dB. Maximum gain variation is 0.771. By selecting the proper gain values for the VGAs, a stable amplitude response around 5.5 dB can be ensured. This is applicable to other cases but the particular gain values may be different depending on the VGAs used.

There is an avoidable ripple in amplitude due to the fact that at the central frequency, $f_0$, the two signals are perfectly in phase. While at the edge of the BW, $f_1$, $f_2$, the two signals are not in phase due to the different phase slope of each signal.

In a system compensating up to 3λ that ripple is +/−0.36 dB. Having this type of magnitude for the ripple in the radiating elements does not imply a significant degradation. In fact, most of the array antennas are created using VGAs that work with typical steps of 0.5 dB or 1 dB. However, the ripple effect may limit the maximum delay that is considered appropriate for a particular application.

Figure 10:
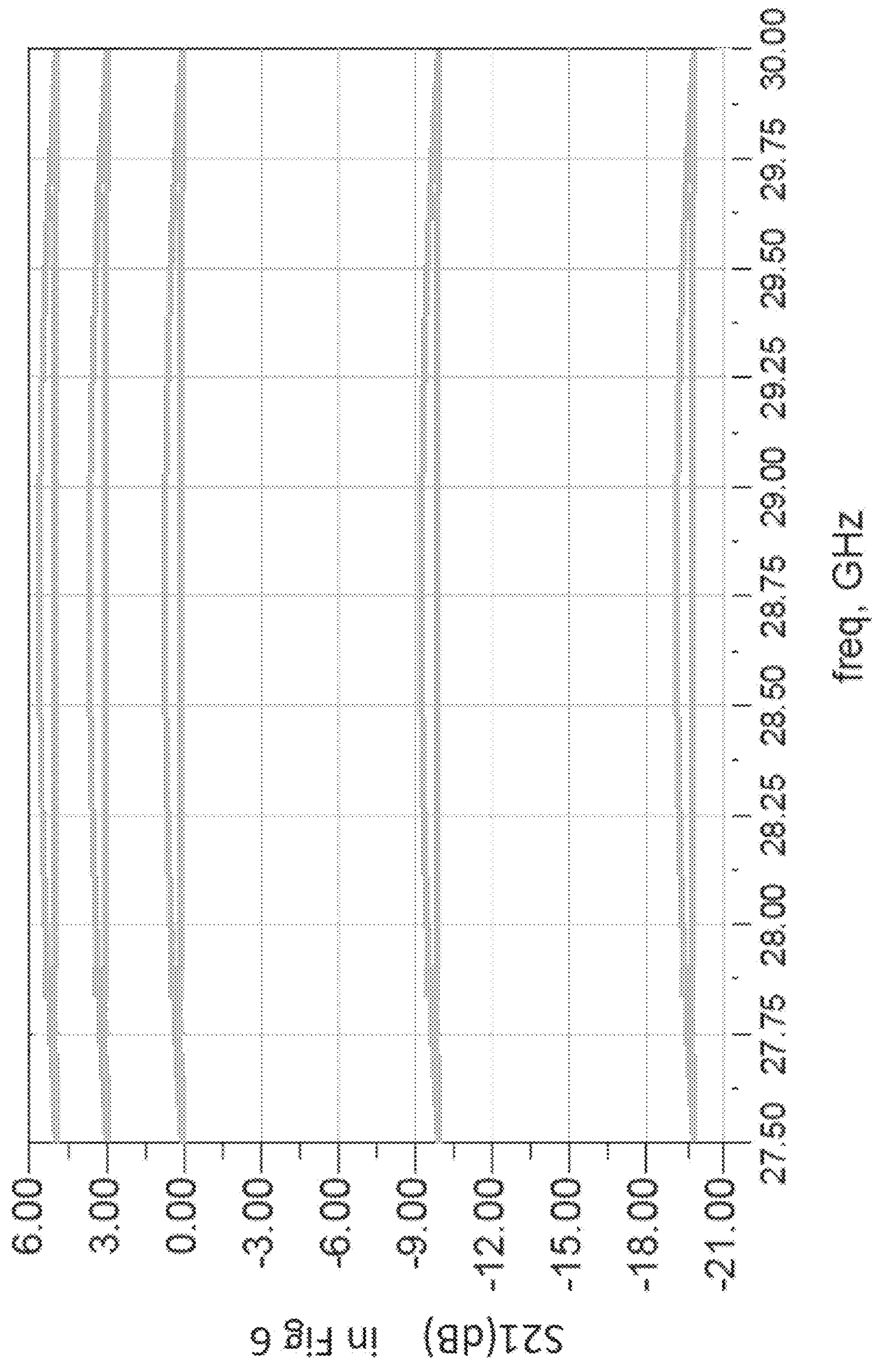
FIG. 10 illustrates the simulation results for fixed 3λ delay line. Use as a VGA at the same time. Amplitude response can be seen S21(dB)
Figure 11:
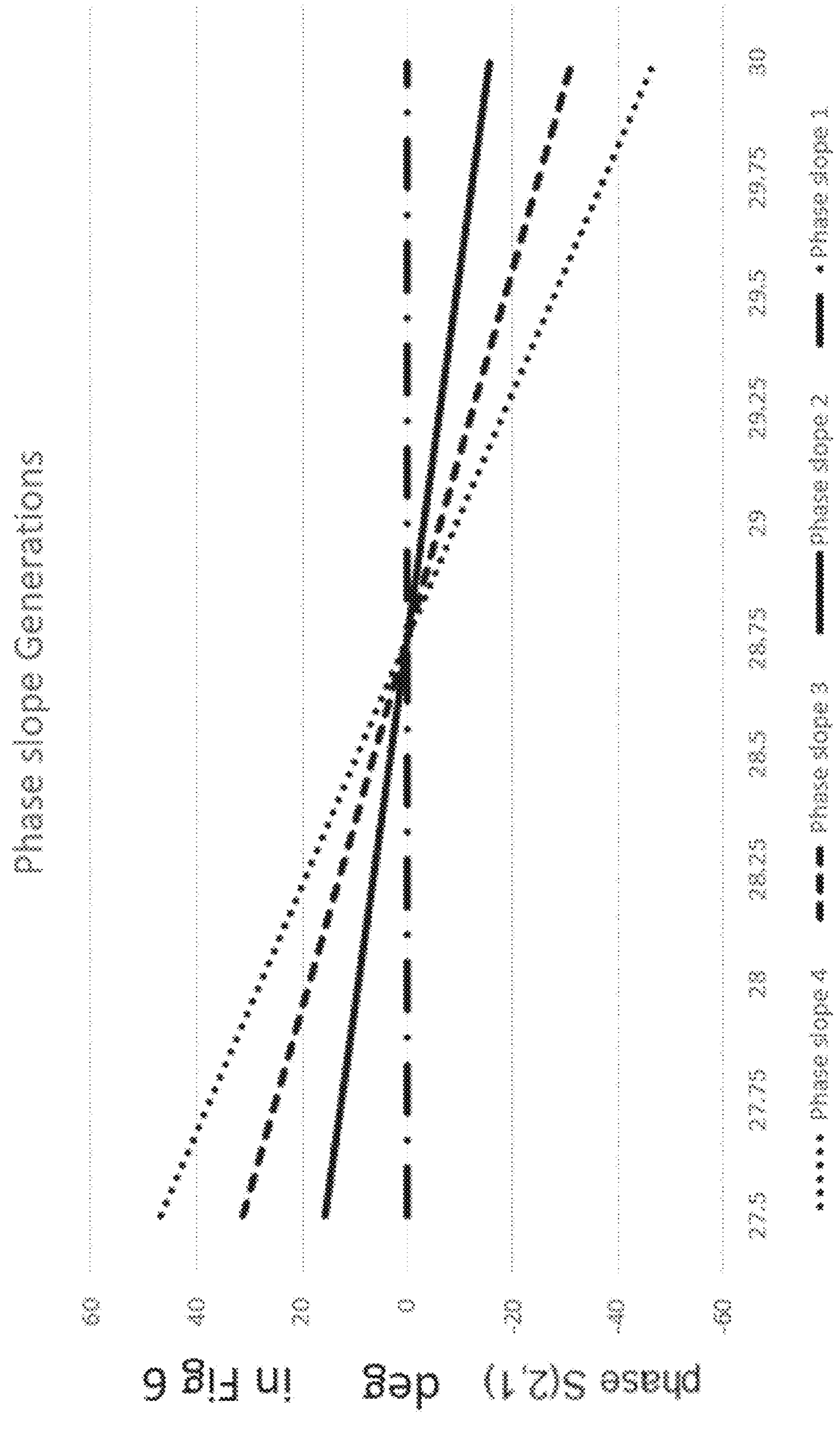
FIG. 11. illustrates a graph of simulation results of phase S(2,1) deg, where can be seen a phase slope compensation module with a fixed 3λ delay line according to the embodiment of FIG. 6.

FIGS. 10 and 11 illustrate how the present system may act as a VGA itself. FIG. 10 is representation of amplitude response (S21 in dB) versus frequency and FIG. 11 is a phase response (S21 in deg) versus frequency. As can be seen in FIG. 6 there are two ports, an output port and an input port being the relationship in amplitude and phase between them represented as the S(2,1) in dB and the S(2,1) in degrees. When selecting the values of gain of each VGA 11, 12 a total gain value is obtained. Examples represented in FIG. 11 correspond to the tables 2-5 below.

TABLE 2

| Gain total @27.5 GHz = 3 dB | | |
|---|---|---|
| Phase (27.5 GHz) | Gain1 (dB) | Gain2 (dB) |
| 46.8 | 9 | −40 |
| 31.2 | 6.1 | 0.3 |
| 15.7 | 0.3 | 6.1 |
| 0.0 | −40 | 9 |

TABLE 3

| Gain total @27.5 GHz = 0 dB | | |
|---|---|---|
| Phase (27.5 GHz) | Gain1 (dB) | Gain2 (dB) |
| 46.8 | 6 | −40 |
| 31.2 | 3.1 | −2.7 |
| 15.7 | −2.7 | 3.1 |
| 0.0 | −40 | 6 |

TABLE 4

| Gain total @27.5 GHz = −10 dB | | |
|---|---|---|
| Phase (27.5 GHz) | Gain1 (dB) | Gain2 (dB) |
| 46.8 | −4 | −40 |
| 31.2 | −6.8 | −12.7 |
| 15.7 | −12.7 | −6.8 |
| 0.0 | −40 | −4 |

TABLE 5

| Gain total @27.5 GHz = −20 dB | | |
|---|---|---|
| Phase (27.5 GHz) | Gain1 (dB) | Gain2 (dB) |
| 44.9 | −14 | −40 |
| 31.2 | −16.9 | −22.7 |
| 15.6 | −22.7 | −16.9 |
| 2.0 | −40 | −14 |

For each phase slope exists a full set of amplitude response as can be seen in FIG. 10. The versality of the present system is particularly advantageous for a phase array antenna. However, the system can also be used as VGA and not only for delay compensation. Therefore, if based on discrete components, the conventional VGA can be removed from the phase array antenna. Alternatively, if implemented in a monolithic microwave integrated circuit (MMIC), area in the die for allocating the VGA can be saved. As a result, a benefit in terms of integration and cost is obtained. The fixed delay line can be implemented physically. By physically is meant printed line in a PCB or inside a die for instance. Alternatively, it can be implemented with lumped elements in a die, but in an externally manner with two input pins to the circuit.

Since a complete beamformer is desired, which is the case in a phased array antenna, a separated circuit with a phase shifter 20 needs to be added. The phase shifter 20 includes a vector modulator with four vectors and a gilbert cell. The previous circuit can control the phase slope to avoid beam-squint and the gain level but the offset in phase is still needed.

The connection can be made straight forward in discrete components. If the implementation of both modules is done inside a MMIC, the design may be simplified with a benefit in terms of size, cost and integration. Additionally, MMIC physical implementation, can use a Gilbert cell to further optimize cost and size.

Figure 12:
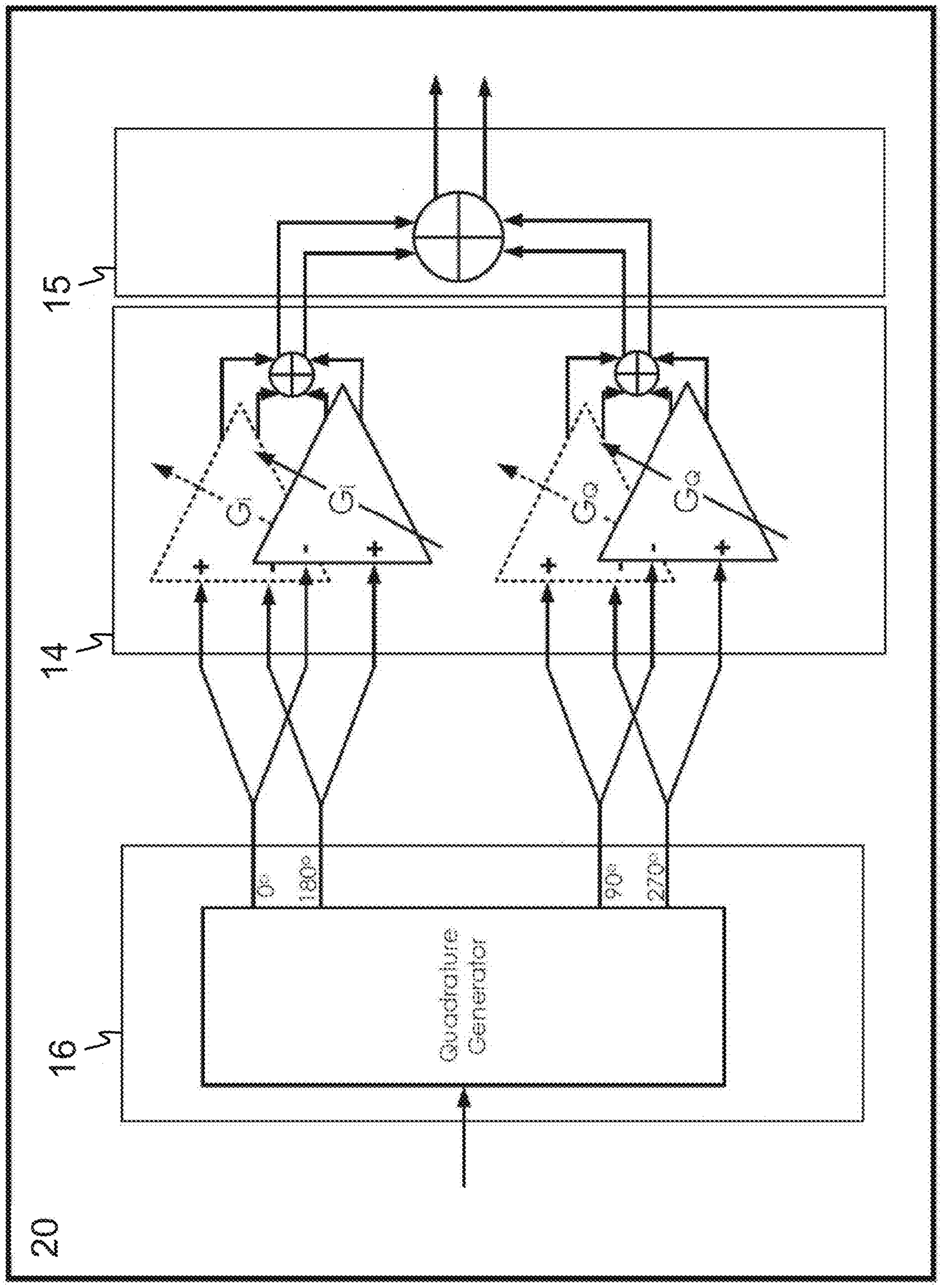
FIG. 12 Illustrates a complete solution to avoid beam squint in a phase array antenna according to an embodiment of the invention.

FIG. 12 illustrates a high-level block representation of the phase shifter 20 as a vector modulator. The phase shifter 20 includes a quadrature generator 16, a group of four VGAs 14 and a combiner 15. The quadrature generator 16 that provides four signals with 0, 90, 180 and 270 degrees of phase. These signals are the input for the four VGAs 14. The combiner 15 will join the four signals creating a gilbert cell that mixes and provides the final output.

Figure 13:
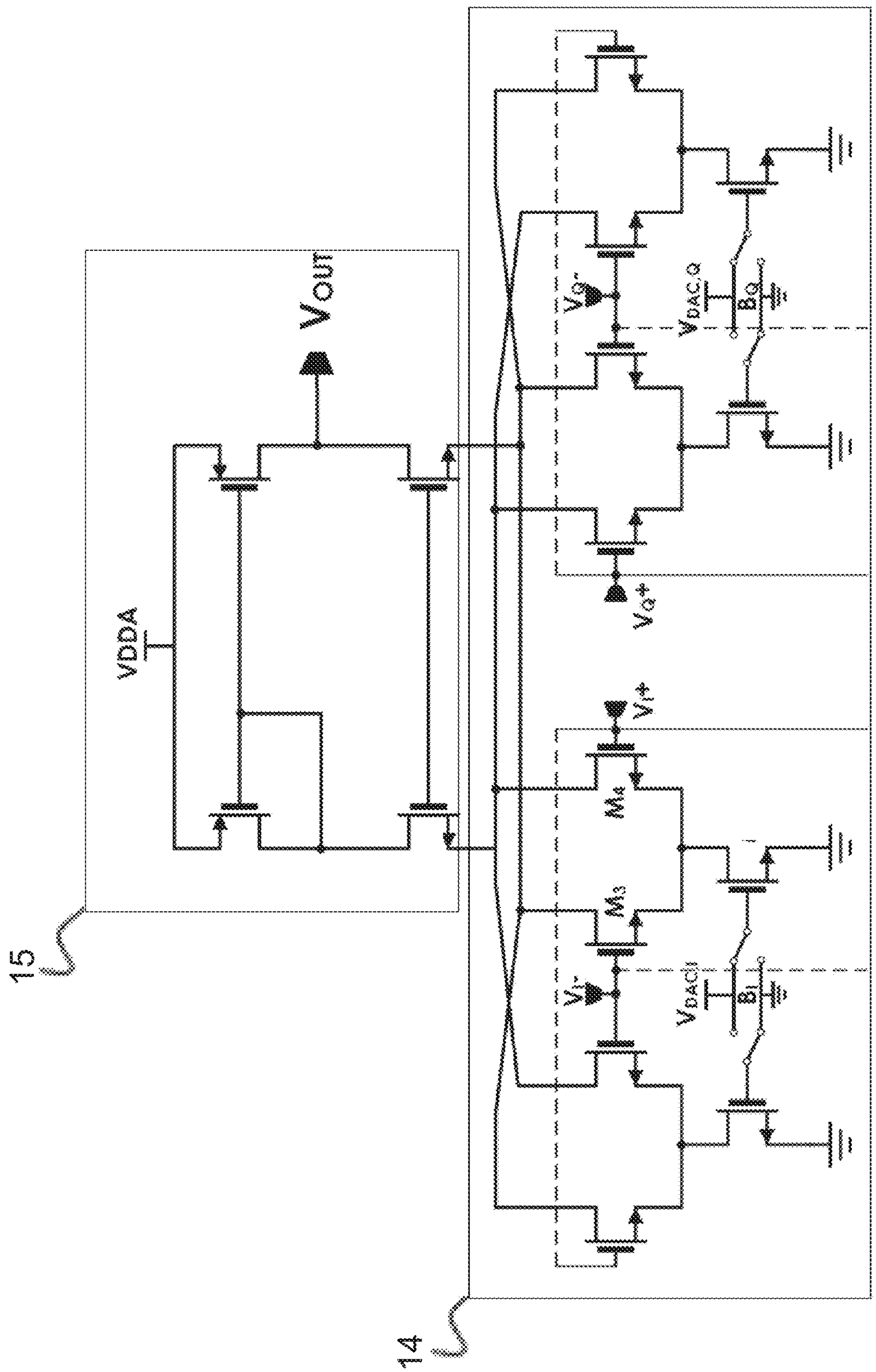
FIG. 13 Illustrates the Vector modulator circuit layout. Gilbert cell.

FIG. 13 illustrates a physical implementation of some elements of the phase shifter (the quadrature generator that will be shown later). The phase shifter 20 structure is based on a vector modulator 14 approach. Four inputs with different phase 0 deg, 90 deg, 180 deg, 270 deg are created by the quadrature generator 16 of FIG. 12. Four VGAs are used in the vector modulator 14, one for each input. The four outputs of the vector modulator 14 are combined in the combiner 15.

Figure 14:
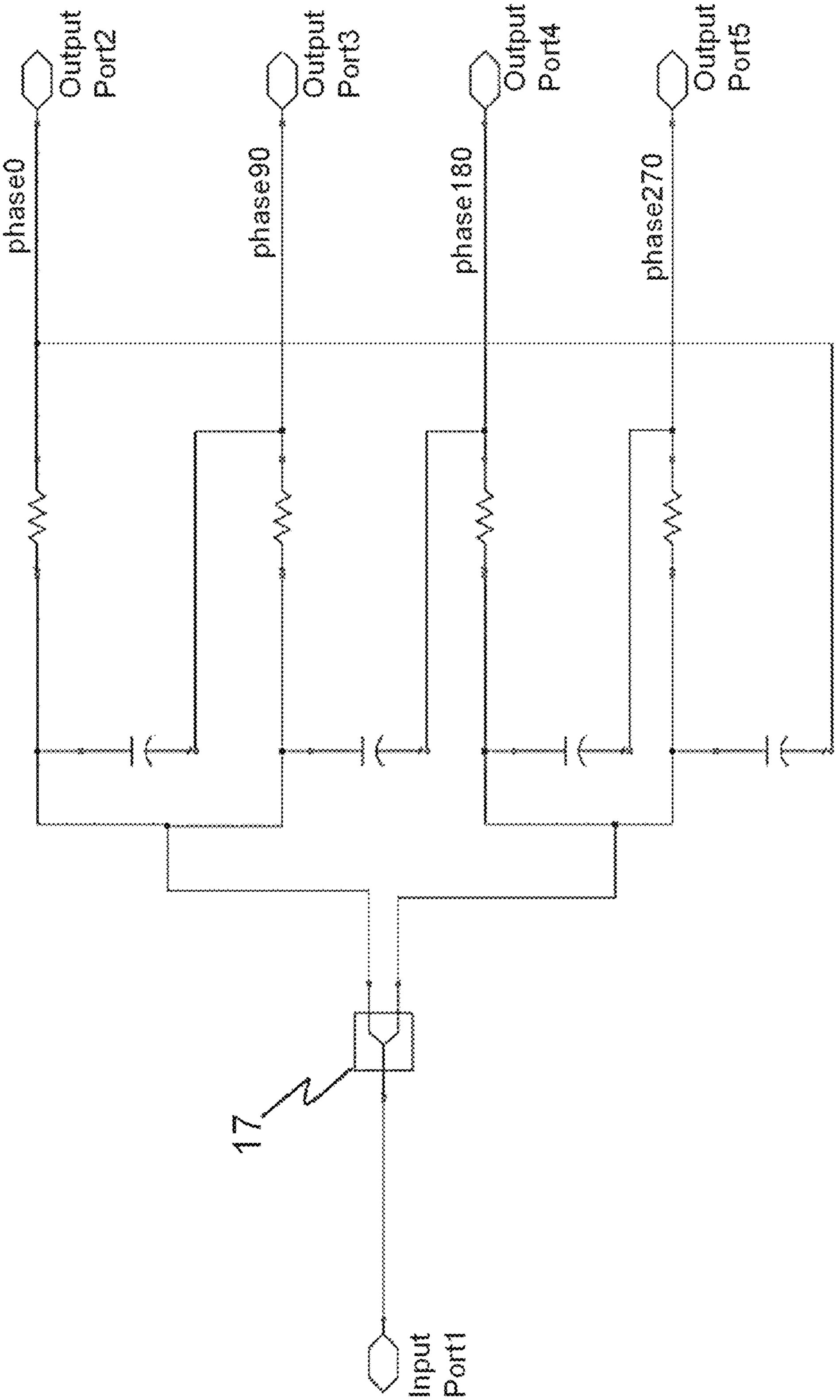
FIG. 14 Illustrates a circuit layout for simulation of the polyphase filter.

As previously illustrated, the output of the phase slope compensation module 10 is interconnected to the phase shifter 20. The connection is directly made through a RC circuit able to create the quadrature phases. An example of this RC circuit is presented in FIG. 14, showing the RC circuit 16, a first divider 17 with each output 180 deg out of phase is needed. This RC circuit 16 can create the four quadrature signals with the right phase 0 deg, 90 deg, 180 deg and 270 deg in a much more compact and smaller than the usual polyphase circuit used in the development of broadband phase shifter 20. Usually, polyphase circuits involve inductors what is a quite big circuit to be implemented. The reason to include inductors and not having only resistors and capacitors, as in the RC circuits, is to avoid an undesired phase slope that is created in the RC polyphase circuits.

Figure 15:
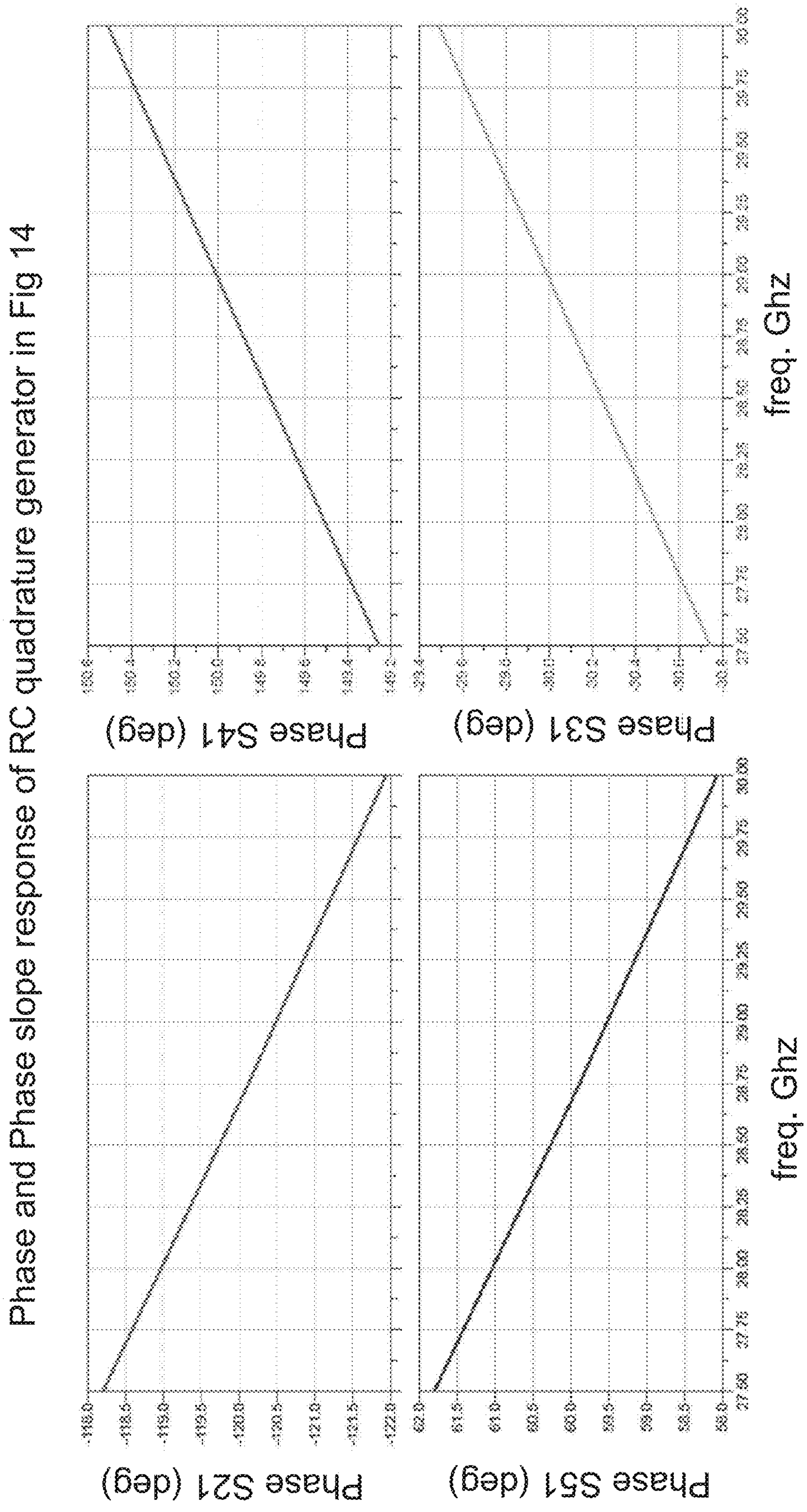
FIG. 15 Illustrates the phase frequency response of the four vectors of the polyphase filter.

In FIG. 15 it can be seen the phase slope for each of the four signals of the quadrature of a polyphase circuit based on a RC circuit. In the figure we can see frequency in the X axis and phase (deg) in the Y axis. As can be seen in FIG. 14 there are five ports, four output ports and an input port being the relationship in phase between them represented as the S(x, 1) in degrees. As can be seen two of these signals (0 deg and 180 deg) have a negative phase slope while the other two signals (90 deg and 270 deg) have a positive phase slope. This difference in phase slope of each signal has an impact in the overall performance. When a phase shifter produces different phase shifting, different phase slopes are created, which used to be an issue is most of the phase array antennas. However, taking into account that a phase slope compensation module is included in the whole system, that issue can be compensated easily in that circuit.

The phase slope compensation module 10 and the phase shifter 20 may have a similar structure. The phase slope compensation module 10 is easier to implement as it only involves two lines circuits with no need of a polyphase filter. The phase shifter 20 can become more compact than usual.

Typically, phase shifters are made to have a flat response in phase along the BW. In order to avoid an undesired phase slope around the BW, the quadrature generator involves big inductors which are unsuitable for the compactness. There are other ways, avoiding inductors, to create the polyphase filter, as the RC polyphase structures. However, these structures create an undesired phase slope response.

In the present system, more compact structures for phase shifting generation are completely acceptable since another module is controlling the phase slope and thus this issue can be easily corrected. It is able of producing a suitable phase and phase slope response at the same time. As a whole, the size of the phase shifter 20 can be equal or even smaller than a conventional phase shifter. Advantageously, delay compensation function allows the system to work without beam squint for a large BW. Advantageously, the phase shifter 20 can work as VGA at the same time is a further benefit.

There are some considerations regarding the function of the system.

One point is creating a proper fixed delay line. The fixed delay line can be implemented with lumped elements in a MMIC. A lumped element should be understood as resistor, capacitor or inductor. However, usually the structures based on lumped elements are quite lossy and there is a critical parameter to consider, namely, the delay flatness. For instance, if a delay line is implemented with lumped elements for 100 ps, it should be flat around the band both in delay and amplitude. Otherwise, the dynamic range and performance of the circuit will be degraded. Implementing the delay line physically inside a MMIC is feasible but will mean again some losses and complex EM simulation. A sensible alternative is to do it outside the MMIC in printed technology and keep two pin inputs in the MMIC.

Another point is the selection of the gain values of the table for the gain of each amplifier. A wrong selection can get the system working as a delay control but will mean a strong ripple in amplitude and degrade the performance of the system.

A third point relates to the transistors need to be stable in phase when changing the gain value. Otherwise, the system may become unstable and can appear strong ripples in phase and amplitude.

If these three points are addressed, the system provides phase and amplitude control while avoiding beam squint. These features make the system particularly suitable for wideband applications in phase array antennas. There is only a minor problem which is a small ripple in amplitude that cannot be eluded. Yet it may be problematic only when very long delays need to be compensated. The layout of a MMIC can become less complex if the fixed delay line is not included inside but outside the MMIC.

The present system allows for small size manufacturing embodiments and achieves gain instead of losses, compared to the switching delay control approach, what has its benefits in terms of power consumption too. These are improvements over prior-art solutions where extra amplifiers are required.

These and other features, functions, and advantages that have been discussed can be achieved independently in various embodiments or may be combined in yet other embodiments.

The invention claimed is:

1. A system for controlling a phase array antenna, the system comprising:

a plurality of compensation units (2), wherein each compensating unit (2) is associated to an individual radiating element (30) of the phase array antenna, wherein each compensation unit (2) comprises:

a phase slope control module (10) configured to control the phase slope of a radio frequency (RF) signal, wherein the phase slope control module (10) comprises a no-delay line comprising a first variable gain amplifier (11) for outputting a non-delayed signal and a delay line comprising a second variable gain amplifier (12) and a delay line element (13) for outputting a delayed signal, wherein the gain of the first amplifier (11) and the gain of the second amplifier (12) are interrelated forming an asymmetric relationship therebetween, so that the greater the gain of the first amplifier, the smaller the gain of the second amplifier, and vice versa;

a phase shifter (20) configured to control the phase shifting of a RF signal, wherein the phase shifter (20) and the phase slope control module (10) are interconnected and coupled to the individual radiating element (30).

2. The system for controlling a phase array antenna of claim 1, wherein in a compensation unit (2), the gain of the first amplifier and the gain of the second amplifier are controlled in differential mode.

3. The system for controlling a phase array antenna of claim 1, wherein the delay line element (13) of each compensation unit (2) depends on a bandwidth used by the phase array antenna.

4. The system for controlling a phase array antenna of claim 3, wherein the delay line element (13) of each compensation unit (2) further depends on the number of radiating elements included in the phase array antenna.

5. The system for controlling a phase array antenna of claim 3, wherein the delay line element (13) of each compensation unit (2) depends on a scan angle range of the phase array antenna.

6. The system for controlling a phase array antenna of claim 1, wherein the delay line element (13) produces an integer number of wavelengths of path length for a center frequency in a bandwidth used by the phase array antenna.

7. The system for controlling a phase array antenna of claim 1, wherein the phase shifter (20) is connected either as an input to the phase slope control module (10), or to the output of the phase slope control module (10).

8. The system for controlling a phase array antenna of claim 1, wherein for each compensation unit (2), the phase slope control module (10) is further configured to adjust the phase slope of a RF signal for the radiating element (30) according to the change in phase slope produced by the phase shifter (20).

9. The system for controlling a phase array antenna of claim 1, wherein each compensation unit (2) is configured to calculate the gain value of the variable gain amplifier (11,12) according to a maximum scan angle within a scan angle range for the radiating element (30) of the phase array antenna.

10. The system for controlling a phase array antenna of claim 1, wherein the phase shifter (20) comprises a RC polyphase circuit (16) filter and a gilbert cell (14,15).

11. The system for controlling a phase array antenna of claim 1, wherein at least the delay line of the phase slope control module (10) is printed in a circuit board or inside a circuit die.

12. The system for controlling a phase array antenna of claim 1, wherein the delay line is externally implemented and comprises pins and lumped elements in a die.

13. The system for controlling a phase array antenna of claim 1, further comprising a processing unit (3) configured to individually and selectively coordinate the plurality of compensation units (2).

* * * * *